United States Patent
Hall et al.

(10) Patent No.: US 7,555,774 B2
(45) Date of Patent: Jun. 30, 2009

(54) INLINE INTRUSION DETECTION USING A SINGLE PHYSICAL PORT

(75) Inventors: Michael Lee Hall, Austin, TX (US);
Kevin L. Wiley, Austin, TX (US);
Munawar Hossain, Austin, TX (US);
Joseph M. Sirrianni, Ceder Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 796 days.

(21) Appl. No.: 10/910,194

(22) Filed: Aug. 2, 2004

(65) Prior Publication Data
US 2006/0023709 A1    Feb. 2, 2006

(51) Int. Cl.
*H04L 29/00*    (2006.01)
(52) U.S. Cl. ........................................................ 726/22
(58) Field of Classification Search ............... 726/22, 726/23
See application file for complete search history.

(56) References Cited

U.S. PATENT DOCUMENTS

| | | | |
|---|---|---|---|
| 3,974,328 A | 8/1976 | Thomas et al. ............ 178/6.8 |
| 4,103,847 A | 8/1978 | Thomas et al. ............ 244/3.18 |
| 4,286,261 A | 8/1981 | Wagner et al. ............ 340/565 |
| 4,931,740 A | 6/1990 | Hassanzadeh et al. ....... 324/457 |
| 4,991,146 A | 2/1991 | Ransdell et al. ............ 367/98 |
| 5,311,510 A | 5/1994 | Moriue et al. ............ 370/428 |
| 5,557,742 A | 9/1996 | Smaha et al. ............ 395/186 |
| 5,963,556 A | 10/1999 | Varghese et al. ............ 370/401 |
| 6,035,405 A | 3/2000 | Gage et al. ............ 713/201 |
| 6,279,113 B1 * | 8/2001 | Vaidya ............ 726/23 |
| 6,477,651 B1 | 11/2002 | Teal ............ 713/200 |
| 6,487,666 B1 | 11/2002 | Shanklin et al. ............ 713/201 |
| 6,560,236 B1 | 5/2003 | Varghese et al. ............ 370/401 |
| 6,584,565 B1 | 6/2003 | Zamek ............ 713/156 |
| 6,647,400 B1 | 11/2003 | Moran ............ 707/205 |
| 6,715,084 B2 | 3/2004 | Aaron et al. ............ 713/201 |
| 6,785,821 B1 | 8/2004 | Teal ............ 713/200 |
| 6,792,546 B1 | 9/2004 | Shanklin et al. ............ 713/201 |
| 6,826,697 B1 | 11/2004 | Moran ............ 713/201 |
| 6,898,632 B2 | 5/2005 | Gordy et al. ............ 709/224 |

(Continued)

OTHER PUBLICATIONS

Scott A. Cothrell, et al., "Inline Intrusion Detection," U.S. Appl. No. 11/039,219, currently pending, 25 pages, Jan. 20, 2005.

(Continued)

*Primary Examiner*—Matthew B Smithers
(74) *Attorney, Agent, or Firm*—Baker Botts L.L.P.

(57) ABSTRACT

In accordance with one embodiment of the present invention, a method for inline intrusion detection includes receiving a packet at a physical interface of an intrusion detection system. The packet is tagged with a first VLAN identifier associated with an external network. The network further includes buffering the packet at the physical interface, communicating a copy of the packet to a processor, and analyzing the copy of the packet at the processor to determine whether the packet includes an attack signature. The method also includes communicating a reply message from the processor to the interface indicating whether the packet includes an attack signature. If the packet does not contain an attack signature the buffered copy of the packet is re-tagged with a second VLAN identifier associated with a protected network and re-tagged packet is communicated to the protected network.

17 Claims, 2 Drawing Sheets

U.S. PATENT DOCUMENTS

| | | | |
|---|---|---|---|
| 6,928,549 B2 | 8/2005 | Brock et al. | 713/194 |
| 6,950,628 B1 | 9/2005 | Meier et al. | 455/41.2 |
| 6,996,843 B1 | 2/2006 | Moran | 726/23 |
| 7,032,114 B1 | 4/2006 | Moran | 713/187 |
| 7,051,365 B1 | 5/2006 | Bellovin | 726/11 |
| 7,076,803 B2 | 7/2006 | Bruton, III et al. | 726/23 |
| 7,107,612 B1 | 9/2006 | Xie et al. | 726/13 |
| 7,150,043 B2 | 12/2006 | Brock et al. | 726/23 |
| 7,177,295 B1 | 2/2007 | Sholander et al. | 370/338 |
| 7,222,366 B2 | 5/2007 | Bruton, III et al. | 726/23 |
| 7,281,269 B1 | 10/2007 | Sievers et al. | 726/24 |
| 7,310,815 B2 | 12/2007 | Yanovsky | 726/13 |
| 7,331,061 B1 | 2/2008 | Ramsey et al. | 726/23 |
| 2002/0009078 A1 | 1/2002 | Wilson et al. | 370/389 |
| 2002/0069356 A1 | 6/2002 | Kim | 713/160 |
| 2002/0073337 A1 | 6/2002 | Ioele et al. | 713/201 |
| 2002/0101870 A1 | 8/2002 | Chase et al. | 370/389 |
| 2002/0107961 A1 | 8/2002 | Kinoshita | 709/225 |
| 2002/0143948 A1 | 10/2002 | Maher, III et al. | 709/226 |
| 2003/0009693 A1 | 1/2003 | Brock et al. | 713/201 |
| 2003/0014662 A1 | 1/2003 | Gupta et al. | 713/200 |
| 2003/0061514 A1 | 3/2003 | Bardsley et al. | 713/201 |
| 2003/0069972 A1 | 4/2003 | Yoshimura et al. | 709/226 |
| 2003/0084318 A1 | 5/2003 | Schertz | 713/200 |
| 2003/0084321 A1 | 5/2003 | Tarquini et al. | 713/200 |
| 2003/0084328 A1 | 5/2003 | Tarquini et al. | 713/200 |
| 2003/0084329 A1 | 5/2003 | Tarquini | 713/200 |
| 2003/0084344 A1 | 5/2003 | Tarquini et al. | 713/201 |
| 2003/0110393 A1 | 6/2003 | Brock et al. | 713/200 |
| 2003/0145225 A1 | 7/2003 | Bruton, III et al. | 713/201 |
| 2003/0145226 A1 | 7/2003 | Bruton et al. | 713/201 |
| 2003/0149887 A1 | 8/2003 | Yadav | 713/200 |
| 2003/0154399 A1* | 8/2003 | Zuk et al. | 713/201 |
| 2003/0188190 A1 | 10/2003 | Aaron et al. | 713/201 |
| 2003/0188191 A1 | 10/2003 | Aaron et al. | 713/201 |
| 2003/0236992 A1 | 12/2003 | Yami | 713/200 |
| 2004/0030927 A1* | 2/2004 | Zuk | 713/201 |
| 2004/0049596 A1 | 3/2004 | Schuehler et al. | 709/238 |
| 2004/0049693 A1 | 3/2004 | Douglas | 713/200 |
| 2004/0059942 A1 | 3/2004 | Xie | 713/201 |
| 2004/0083295 A1 | 4/2004 | Amara et al. | 709/229 |
| 2004/0093513 A1 | 5/2004 | Cantrell et al. | 713/201 |
| 2004/0117478 A1 | 6/2004 | Triulzi et al. | 709/224 |
| 2004/0202157 A1 | 10/2004 | Chase et al. | 370/389 |
| 2004/0221171 A1 | 11/2004 | Ahmed et al. | 713/200 |
| 2004/0221178 A1 | 11/2004 | Aaron et al. | 713/201 |
| 2004/0255154 A1 | 12/2004 | Kwan et al. | 713/201 |
| 2004/0260945 A1 | 12/2004 | Raikar et al. | 713/201 |
| 2005/0005031 A1 | 1/2005 | Gordy et al. | 709/250 |
| 2005/0018618 A1* | 1/2005 | Mualem et al. | 370/252 |
| 2005/0022018 A1 | 1/2005 | Szor | 713/201 |
| 2005/0044199 A1 | 2/2005 | Shiga et al. | 709/223 |
| 2005/0058132 A1 | 3/2005 | Okano et al. | 370/389 |
| 2005/0071642 A1 | 3/2005 | Moghe et al. | 713/182 |
| 2005/0071643 A1 | 3/2005 | Moghe | 713/182 |
| 2005/0071644 A1 | 3/2005 | Moghe et al. | 713/182 |
| 2005/0076245 A1 | 4/2005 | Graham et al. | 713/201 |
| 2005/0081058 A1 | 4/2005 | Chang et al. | 713/201 |
| 2005/0097358 A1 | 5/2005 | Yanovsky | 713/201 |
| 2005/0132230 A1 | 6/2005 | Miclea et al. | 713/201 |
| 2005/0157653 A1 | 7/2005 | Zeitak et al. | 370/241 |
| 2005/0185626 A1 | 8/2005 | Meier et al. | 370/338 |
| 2005/0193429 A1* | 9/2005 | Demopoulos et al. | 726/23 |
| 2005/0216770 A1 | 9/2005 | Rowett et al. | 713/201 |
| 2005/0226257 A1 | 10/2005 | Mirzabegian et al. | 370/401 |
| 2005/0229246 A1 | 10/2005 | Rajagopal et al. | 726/14 |
| 2005/0259646 A1 | 11/2005 | Smith et al. | 370/389 |
| 2005/0278178 A1 | 12/2005 | Girouard et al. | 704/270 |
| 2005/0283831 A1 | 12/2005 | Ryu et al. | 726/11 |
| 2006/0007903 A1* | 1/2006 | Hammell et al. | 370/342 |
| 2006/0085855 A1 | 4/2006 | Shin et al. | 726/23 |
| 2006/0161983 A1* | 7/2006 | Cothrell et al. | 726/23 |
| 2007/0058551 A1* | 3/2007 | Brusotti et al. | 370/241 |

OTHER PUBLICATIONS

USPTO; Office Action (by Examiner Minh Dieu T. Nguyen); for U.S. Appl. No. 10/903,391, (7 pages).
USPTO; Office Action (by Examiner David Cervetti); for U.S. Appl. No. 11/039,219, (14 pages).
CISCO PIX Firewall and VPN Configuration Guide, Ver. 6.3 cisco Systems (466 pages).
Cisco IOS FIrewall Design Guide, Cisco Systems (60 pages).
Cisco Secure Policy Manager Solution Guide Series: Intrusion Detection System, Ver. 2.3.1i (175 pages).
Cisco Router and Security Device Manager Firewall Policy Management Application Note, Cisco Systems, (19 pages).
USPTO; Office Action (by Examiner David Cervetti); for U.S. Appl. No. 11/039,219, (14 pages).

* cited by examiner

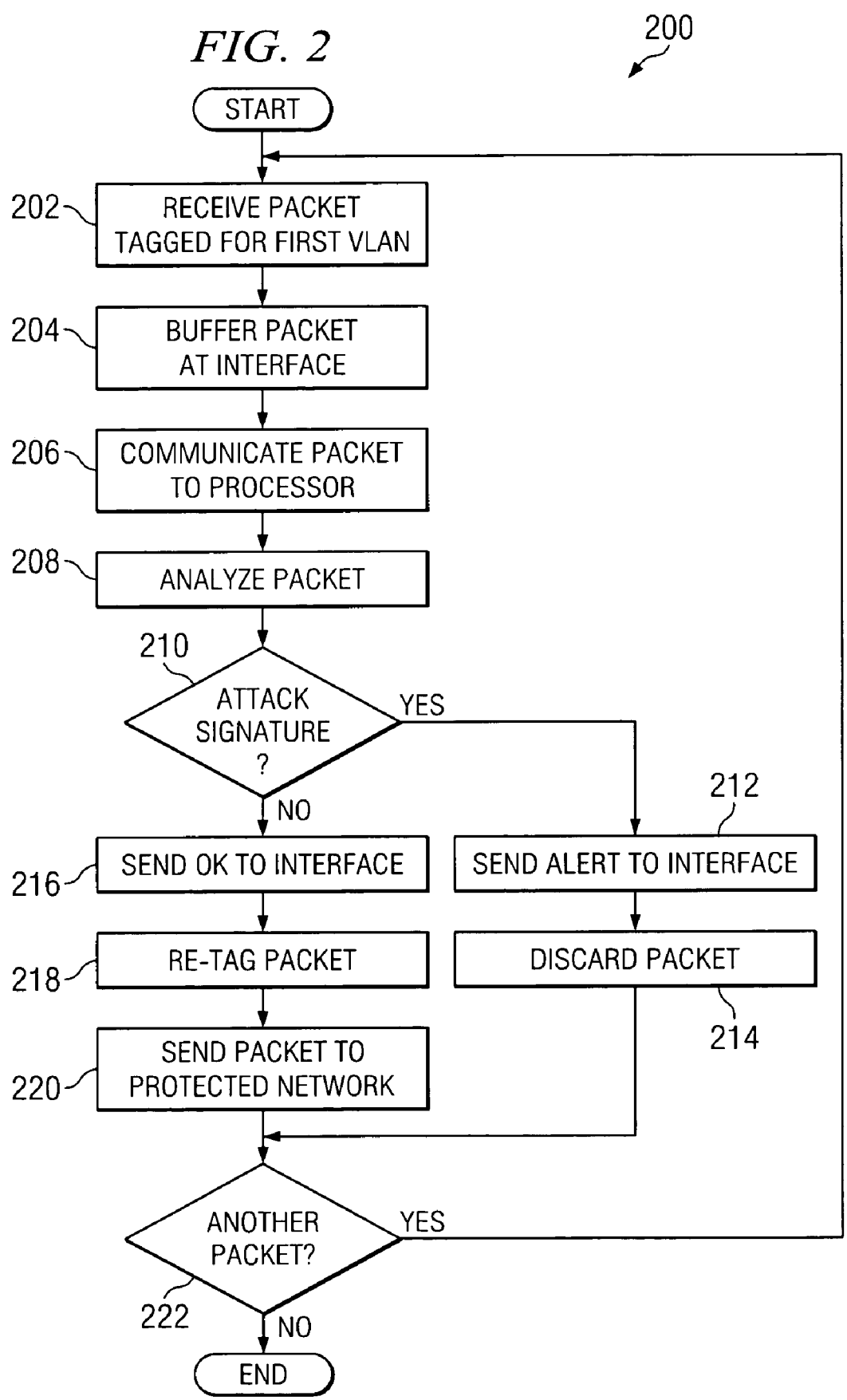

INLINE INTRUSION DETECTION USING A SINGLE PHYSICAL PORT

TECHNICAL FIELD OF THE INVENTION

The present invention relates generally to the field of network security, and more particularly to inline intrusion detection using a single physical port.

BACKGROUND OF THE INVENTION

Intrusion detection systems (IDSs) generally operate in one of two modes. In "promiscuous" mode, the IDS monitors incoming network traffic to determine whether a particular pattern characteristic of an intrusion can be observed. In "inline" mode, network traffic is scanned by the IDS to determine whether it contains a hostile signature. If a hostile signature is detected, the IDS prevents the network from receiving the traffic. Generally, inline IDSs have two physical ports, one coupled to the outside network and one coupled to the protected network. On the other hand, IDSs operating in promiscuous mode only need one physical port to receive network traffic.

SUMMARY OF THE INVENTION

In accordance with one embodiment of the present invention, a method for inline intrusion detection includes receiving a packet at a physical interface of an intrusion detection system. The packet is tagged with a first VLAN identifier associated with an external network. The network further includes buffering the packet at the physical interface, communicating a copy of the packet to a processor, and analyzing the copy of the packet at the processor to determine whether the packet includes an attack signature. The method also includes communicating a reply message from the processor to the interface indicating whether the packet includes an attack signature. If the packet does not contain an attack signature the buffered copy of the packet is re-tagged with a second VLAN identifier associated with a protected network and re-tagged packet is communicated to the protected network.

In accordance with another embodiment of the present invention, an intrusion detection system includes an interface operable to receive a packet that is tagged with a first VLAN identifier associated with an external network. The interface is further operable to buffer the packet at the interface, communicate a copy of the packet to a processor, and re-tag the packet with a second VLAN identifier associated with a protected network. The intrusion detection system is also operable to communicate the packet to the protected network. The processor is operable to analyze the copy of the packet to determine if it includes an attack signature and communicate a reply message to the interface indicating whether the packet includes an attack signature. The interface re-tags and communicates the packet only if the reply message indicates that the packet does not include an attack signature.

Important technical advantages of certain embodiments of the present invention include inline intrusion detection using a single port. This allows single-port intrusion detection systems that may have been used for monitoring to be adapted for use as inline systems. Furthermore, it may provide a lower cost alternative to multiple-port devices used for inline intrusion detection.

Other important technical advantages of certain embodiments of the present invention include more efficient use of memory and bus resources in an inline system. Re-tagging packets with a VLAN identifier can be performed at the physical interface. Thus, in contrast with systems that operate at higher layers, such as firewalls, certain embodiments of the present invention allow a packet to be buffered and re-tagged without having to be processed and returned by a processor. This reduces the amount of packet communication between the interface and the processor.

Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 illustrates a flow chart showing an example method of operation for the inline intrusion detection system of FIG. 1.

DETAILED DESCRIPTION OF EXAMPLE EMBODIMENTS OF THE INVENTION

Figure 1:
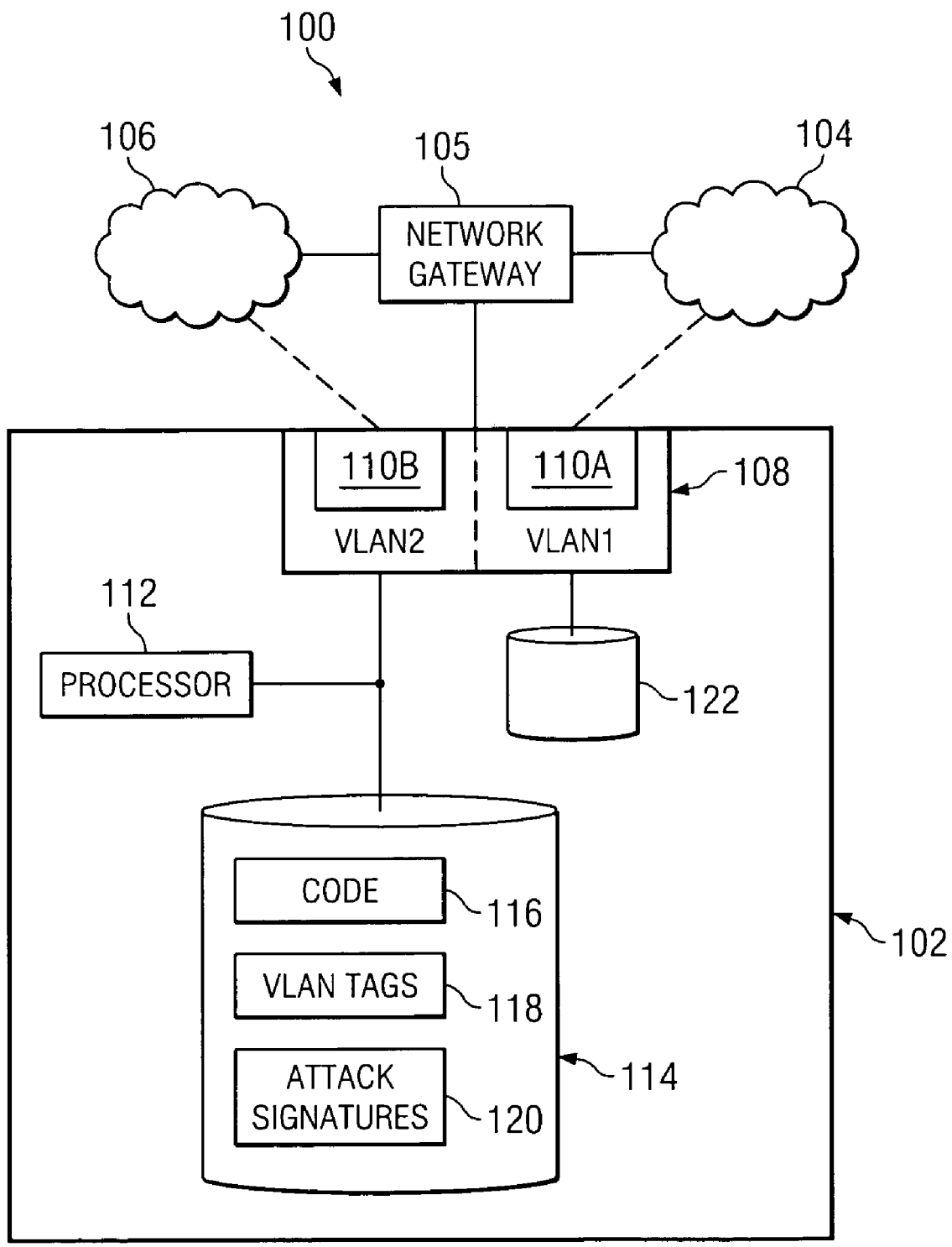
FIG. 1 illustrates an inline intrusion detection system using a single physical port.

FIG. 1 illustrates a computer system 100 that includes an inline intrusion detection system (IDS) 102 between an external network 104 and a protected network 106. Generally, IDS 102 receives information from external network 104 and analyzes the information to determine whether the information includes a signature that is characteristic of a network attack or other hostile action. If an attack is detected, IDS 102 does not send the information to protected network 106. Otherwise, IDS 102 communicates the information to protected network 106.

External network 104 may include any collection of networked communication devices exchanging information. Networked communication devices may include hubs, routers, switches, gateways, personal computers, telephones, or any other device that can exchange information. Devices in external network 104 may exchange information in the form of packets, cells, frames, segments, or other portions of data (collectively referred to as "packets"). External network 104 may use any suitable medium or media of transmission, including wireline, wireless, or optical connections. Devices in external network 104 may communicate with one another using any number of suitable protocols, such as asynchronous transfer mode (ATM), transport control protocol/Internet protocol (TCP/IP), synchronous optical network (SONET), or Ethernet. External network 104 may also include the Internet.

Protected network 106 represents any collection of communication devices communicating in any suitable manner. In particular, protected network 106 may include any of the devices and communication media discussed in conjunction with external network 104. Protected network 106 may also use one or more suitable communication protocols, such as the ones described above. In particular, protected network 106 supports the use of virtual local area networks (VLANs).

A VLAN is a logical separation created between devices that share a physical network, so that devices on one VLAN cannot communicate with one another using the existing physical connections between the devices except through suitable network bridging hardware and/or software. VLANs are described in IEEE specification 802.1q.

Network gateway 105 represents any suitable hardware and/or software that communicates traffic received from external network 106 to protected network 106 and IDS 102. Traffic received from external network 106 is automatically tagged with an identifier for a first VLAN. Protected network 106 is configured to be on a second VLAN, so that it does not recognize traffic tagged with the identifier of the first VLAN. Thus, even though network gateway 105 may replicate the information to all of its ports, such as might take place in a network hub, the traffic will not be recognized by protected network 106 unless tagged with the proper VLAN identifier. Network gateway 105 includes a monitoring port that replicates the contents of incoming network traffic for IDS 102.

IDS 102 is an inline security system that receives traffic from external network 104, analyzes the traffic to determine if it contains an attack signature or other indication of hostile action, and prevents hostile information from reaching protected network 106. In the depicted embodiment, IDS 102 includes an interface 108, a processor 112, and a memory 114. Processor 112 may be any hardware and/or software components suitable for processing information, such as microprocessors, microcontrollers, or digital signal processors (DSPs).

Memory 114 is any suitable form of information storage, which may include magnetic media, optical media, removable media, local storage, remote storage, or other suitable component. In the depicted embodiment, memory 114 stores code 116, VLAN tags 118, and attack signatures 120. Code 116 is executed by processor 112 to perform any suitable task associated with IDS 102. VLAN tags 118 are stored identifiers associated respectively with external network 104 and protected network 106. Attack signatures 120 are recognized patterns of information that indicate that an incoming packet represents a hostile action directed at protected network 106. Processor 112 compares information to attack signatures 120 to detect attacks.

Interface 108 represents a physical connection allowing communication between IDS 102 and devices on protected network 106 and external network 104. Communications with interface 102 take place at layer 2 of the Open Systems Interconnect (OSI) model. Interface 108 supports VLAN trunking. VLAN trunking allows interface 108 to recognize and communicate with multiple VLANS, each identified by a particular VLAN tag. Interface 108 therefore effectively includes multiple logical ports, each associated with a particular VLAN. Interface 108 may tag packets and change existing tags appropriately so that a packet is communicated to a particular VLAN.

In the depicted embodiment, interface 108 establishes a first VLAN for external network 104 and a second VLAN for protected network 106. Thus, interface 108 has two logical ports 110A and 110B. Information received from external network 104 is tagged with the VLAN tag associated with the first VLAN network, so it is not recognized by protected network 106. Once the information is determined to be safe for protected network 106, interface 106 may re-tag the information with the tag of the second VLAN. This effectively communicates information to protected network 106 using logical port 110B, even though interface 108 only includes one physical connection.

Interface 108 also includes a buffer 122. Buffer 122 represents local information storage at interface 108. Buffer 122 may include any suitable form of information storage, such as magnetic media, flash memory, optical media, or other type of information storage medium. Buffer 122 stores incoming information from external network 104 while the information is processed by components of IDS 102. In a particular embodiment, buffer 122 retains a copy of incoming traffic while the traffic is being analyzed by processor 112 to determine whether the incoming information is hostile.

In one example of a mode of operation, network gateway 105 receives traffic from network and tags the traffic with a first VLAN identifier. Network gateway 105 may then broadcast the traffic to all of its ports or may communicate it to IDS 102 only. Protected network 106 is configured to recognize only information on a second VLAN, so even if the packet is broadcast to protected network 106, it will not be recognized. IDS 102 receives the traffic at interface 108 and buffers the traffic in buffer 122. IDS 102 communicates a copy of the packet to processor 112, which analyzes the traffic to determine whether it includes an attack signature. Processor 112 then returns a message to IDS 102 indicating whether the packet includes an attack signature or not. If the packet includes an attack signature, then IDS 102 discards the packet from buffer 112. Otherwise, IDS 102 may re-tag the packet with a second VLAN identifier and communicate the packet back to network gateway 105, which in turn communicates the packet to protected network 106.

One technical advantage of certain embodiments of the present invention is the opportunity to conserve memory and bus resources in IDS 102. Since VLAN re-tagging may be performed at interface 108, interface 108 does not require additional processing resources to move a packet from one VLAN to another. Conversely, network protection systems that operate at higher layers, such as firewalls, typically require network address translation or other similar adjustments to packet header information. Such systems must forward a packet to the appropriate processing resource using an internal bus, and then receive a returned packet suitably modified for communication to the network protected by these systems. In contrast to these conventional systems, interface 108 may receive a reply message, which may be as short as a single bit, that indicates whether or not the packet should be communicated to protected network 106. Thus, IDS 102 may use less internal bus resources and also reduce the load of buffer 122, which need not store both incoming packets and packets returned by processor 112.

FIG. 2 is a flow chart 200 illustrating an example method of operation for IDS 102. IDS 102 receives a packet tagged for a first VLAN at step 202. IDS 102 buffer the packet at interface 108 at step 204. Interface 108 communicates a copy of the packet to processor 112 at step 206.

Processor 112 analyzes the packet by comparing the packet to attack signatures 120 at step 208. If an attack signature is detected at decision step 210, then processor 112 sends an alert to interface 108 at step 212. Interface 108 then discards the packet from buffer 122 at step 214. If an attack signature is not detected, processor 112 sends an OK message to interface 108 at step 216. Interface 108 re-tags the packet with the identifier for the second VLAN associated with protected network 106 at step 218. Interface 108 then communicates the packet to protected network 106 at step 220. The method may be repeated as long as there are incoming packets, as shown by decision step 220.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for inline intrusion detection, comprising:
receiving a packet at a physical interface of an intrusion detection system, wherein the packet is tagged with a first VLAN identifier associated with an external network;
buffering the packet at the physical interface;
communicating a copy of the packet to a processor;
analyzing the copy of the packet at the processor to determine whether the packet includes an attack signature;
communicating a reply message from the processor to the interface indicating whether the packet includes an attack signature; and
if the packet does not contain an attack signature:
re-tagging the buffered copy of the packet with a second VLAN identifier associated with a protected network; and
communicating the re-tagged packet to the protected network.

2. The method of claim 1, further comprising:
receiving the packet from the external network at a network gateway;
tagging the packet with the first VLAN identifier at the network gateway; and
communicating the packet to the interface.

3. The method of claim 2, wherein the step of communicating the re-tagged packet to the protected network comprises:
communicating the re-tagged packet to a first port of the network gateway; and
communicating the re-tagged packet to the protected network using a second port of the network gateway.

4. The method of claim 2, wherein communicating the packet to the interface comprises:
generating a copy of the packet for each of a plurality of ports of the network gateway, wherein one of the ports is coupled to the interface; and
communicating one of the copies of the packet from each of the ports.

5. The method of claim 1, wherein the size of the reply message is less than the size of the packet.

6. Logic embodied in a computer-readable medium operable to perform the steps of:
receiving a packet at a physical interface of an intrusion detection system, wherein the packet is tagged with a first VLAN identifier associated with an external network;
buffering the packet at the physical interface;
communicating a copy of the packet to a processor;
analyzing the copy of the packet at the processor to determine whether the packet includes an attack signature;
communicating a reply message from the processor to the interface indicating whether the packet includes an attack signature; and
if the packet does not contain an attack signature:
re-tagging the buffered copy of the packet with a second VLAN identifier associated with a protected network; and
communicating the re-tagged packet to the protected network.

7. The logic of claim 6, further operable to perform the steps of:
receiving the packet from the external network at a network gateway;
tagging the packet with the first VLAN identifier at the network gateway; and
communicating the packet to the interface.

8. The logic of claim 7, wherein the step of communicating the re-tagged packet to the protected network comprises:
communicating the re-tagged packet to a first port of the network gateway; and
communicating the re-tagged packet to the protected network using a second port of the network gateway.

9. The logic of claim 7, wherein the step of communicating the packet to the interface comprises:
generating a copy of the packet for each of a plurality of ports of the network gateway, wherein one of the ports is coupled to the interface; and
communicating one of the copies of the packet from each of the ports.

10. The logic of claim 6, wherein the size of the reply message is less than the size of the packet.

11. A system, comprising:
means for receiving a packet at a physical interface of an intrusion detection system, wherein the packet is tagged with a first VLAN identifier associated with an external network;
means for buffering the packet at the physical interface;
means for communicating a copy of the packet to a processor, wherein the processor is operable to analyze the copy of the packet at the processor to determine whether the packet includes an attack signature;
means for communicating a reply message from the processor to the interface indicating whether the packet includes an attack signature; and
means for re-tagging the buffered copy of the packet with a second VLAN identifier associated with a protected network if the packet does not contain an attack signature; and
means for communicating the re-tagged packet to the protected network.

12. The system of claim 11, further comprising:
means for receiving the packet from the external network at a network gateway;
means for tagging the packet with the first VLAN identifier at the network gateway; and
means for communicating the packet to the interface.

13. An intrusion detection system, comprising:
an interface operable to:
receive a packet, wherein the packet is tagged with a first VLAN identifier associated with an external network;
buffer the packet at the interface;
communicate a copy of the packet to a processor;
re-tag the packet with a second VLAN identifier associated with a protected network; and
communicate the packet to the protected network; and
the processor operable to:
analyze the copy of the packet to determine if it includes an attack signature; and
communicate a reply message to the interface indicating whether the packet includes an attack signature, wherein the interface re-tags and communicates the packet only if the reply message indicates that the packet does not include an attack signature.

14. The system of claim 13, further comprising a network gateway operable to:
  receive the packet from the external network;
  tag the packet with the first VLAN identifier at the network gateway; and
  communicate the packet to the interface.

15. The system of claim 14, wherein:
  the interface is further operable to communicate the re-tagged packet to a first port of the network gateway; and
  the network gateway is further operable to communicate the re-tagged packet to the protected network using a second port of the network gateway.

16. The system of claim 14, wherein the network gateway is further operable to:
  generate a copy of the packet for each of a plurality of ports of the network gateway, wherein one of the ports is coupled to the interface; and
  communicate one of the copies of the packet from each of the ports.

17. The system of claim 13, wherein the size of the reply message is less than the size of the packet.

* * * * *